(12) United States Patent
Pieroni

(10) Patent No.: US 9,696,240 B2
(45) Date of Patent: Jul. 4, 2017

(54) METHOD OF DETERMINING THE LONGITUDINAL PITCH OF TREAD BAND BLOCKS

(75) Inventor: Nicola Pieroni, Rome (IT)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 707 days.

(21) Appl. No.: 14/122,769

(22) PCT Filed: May 30, 2012

(86) PCT No.: PCT/IB2012/052717
§ 371 (c)(1),
(2), (4) Date: Feb. 11, 2014

(87) PCT Pub. No.: WO2012/164505
PCT Pub. Date: Dec. 6, 2012

(65) Prior Publication Data
US 2014/0149071 A1   May 29, 2014

(30) Foreign Application Priority Data

May 30, 2011   (IT) ............................... TO2011A0471

(51) Int. Cl.
*G01M 17/02*   (2006.01)
*B60C 11/03*   (2006.01)
*B60C 11/13*   (2006.01)

(52) U.S. Cl.
CPC ......... *G01M 17/02* (2013.01); *B60C 11/0318* (2013.04); *B60C 11/1346* (2013.04)

(58) Field of Classification Search
CPC ........................... G01M 17/02; B60C 11/0318
USPC .............. 702/154; 152/209.2, 209.8, 209.16, 152/209.22, 450
See application file for complete search history.

(56) References Cited

U.S. PATENT DOCUMENTS

| 5,301,727 | A | * | 4/1994 | Inoue ...................... B60C 11/11 152/209.18 |
| 5,371,685 | A | | 12/1994 | Bandel et al. |
| 5,951,607 | A | * | 9/1999 | Senn .................... G05D 1/0206 244/194 |
| 5,964,266 | A | * | 10/1999 | Boiocchi ............. B60C 11/0302 152/209.2 |
| 6,311,748 | B1 | * | 11/2001 | Boiocchi ............. B60C 11/0302 152/209.2 |

(Continued)

FOREIGN PATENT DOCUMENTS

| JP | 4363234 A | 12/1992 |
| JP | 200762731 A | 3/2007 |

(Continued)

OTHER PUBLICATIONS

Communication dated Jan. 19, 2016, issued by the Japan Patent Office in corresponding Japanese Application No. 2014-513297.

*Primary Examiner* — Carol S Tsai
(74) *Attorney, Agent, or Firm* — Sughrue Mion PLLC

(57) ABSTRACT

Method of determining the longitudinal pitch of blocks of a tread band having a raised pattern with a number of longitudinal grooves and transverse grooves; the method including the step of calculating a best longitudinal pitch of the blocks, to minimize pass-by noise at a given target speed, as a function of the resonance frequency of the longitudinal grooves and an integer greater than zero.

21 Claims, 5 Drawing Sheets

(56) References Cited

U.S. PATENT DOCUMENTS

| | | | |
|---|---|---|---|
| 6,539,788 B1* | 4/2003 | Mancosu | B60C 19/00 73/146 |
| 7,006,930 B2* | 2/2006 | Stuckey | B60C 11/0318 152/209.2 |
| 7,163,039 B2* | 1/2007 | Boiocchi | B60C 11/0302 152/209.22 |
| 7,434,606 B2* | 10/2008 | Miyabe | B60C 11/0302 152/209.15 |
| 7,769,567 B2* | 8/2010 | Stuckey | B60C 11/0318 703/2 |
| 8,622,104 B2* | 1/2014 | Matrascia | B60C 11/0302 152/209.22 |
| 9,205,706 B2* | 12/2015 | Kline | B60C 11/0311 |
| 9,327,558 B2* | 5/2016 | Stuckey | B60C 11/11 |
| 2002/0005238 A1* | 1/2002 | Boiocchi | B60C 11/0302 152/209.27 |
| 2002/0139460 A1* | 10/2002 | Boiocchi | B60C 11/0302 152/209.2 |
| 2003/0040886 A1 | 2/2003 | Stuckey | |
| 2004/0093106 A1 | 5/2004 | Stuckey | |
| 2006/0137791 A1* | 6/2006 | Miyabe | B60C 11/0302 152/209.18 |
| 2007/0017619 A1* | 1/2007 | Yukawa | B60C 19/002 152/450 |
| 2007/0078633 A1 | 4/2007 | Sundkvist et al. | |
| 2008/0196806 A1* | 8/2008 | Matrascia | B60C 11/0302 152/209.16 |
| 2010/0132864 A1* | 6/2010 | Colombo | B60C 11/0302 152/209.8 |
| 2011/0208488 A1 | 8/2011 | Sakuraba | |
| 2011/0296921 A1 | 12/2011 | Sakuraba | |
| 2012/0318420 A1* | 12/2012 | Sawai | B60C 11/042 152/209.15 |
| 2013/0112326 A1* | 5/2013 | Mellara | B60C 11/13 152/209.19 |
| 2014/0090760 A1* | 4/2014 | Matrascia | B60C 11/0304 152/209.8 |
| 2015/0183273 A1* | 7/2015 | Colombo | B60C 11/0302 152/209.8 |

FOREIGN PATENT DOCUMENTS

| | | |
|---|---|---|
| WO | 2010/032736 A1 | 3/2010 |
| WO | 2010/032737 A1 | 3/2010 |

* cited by examiner

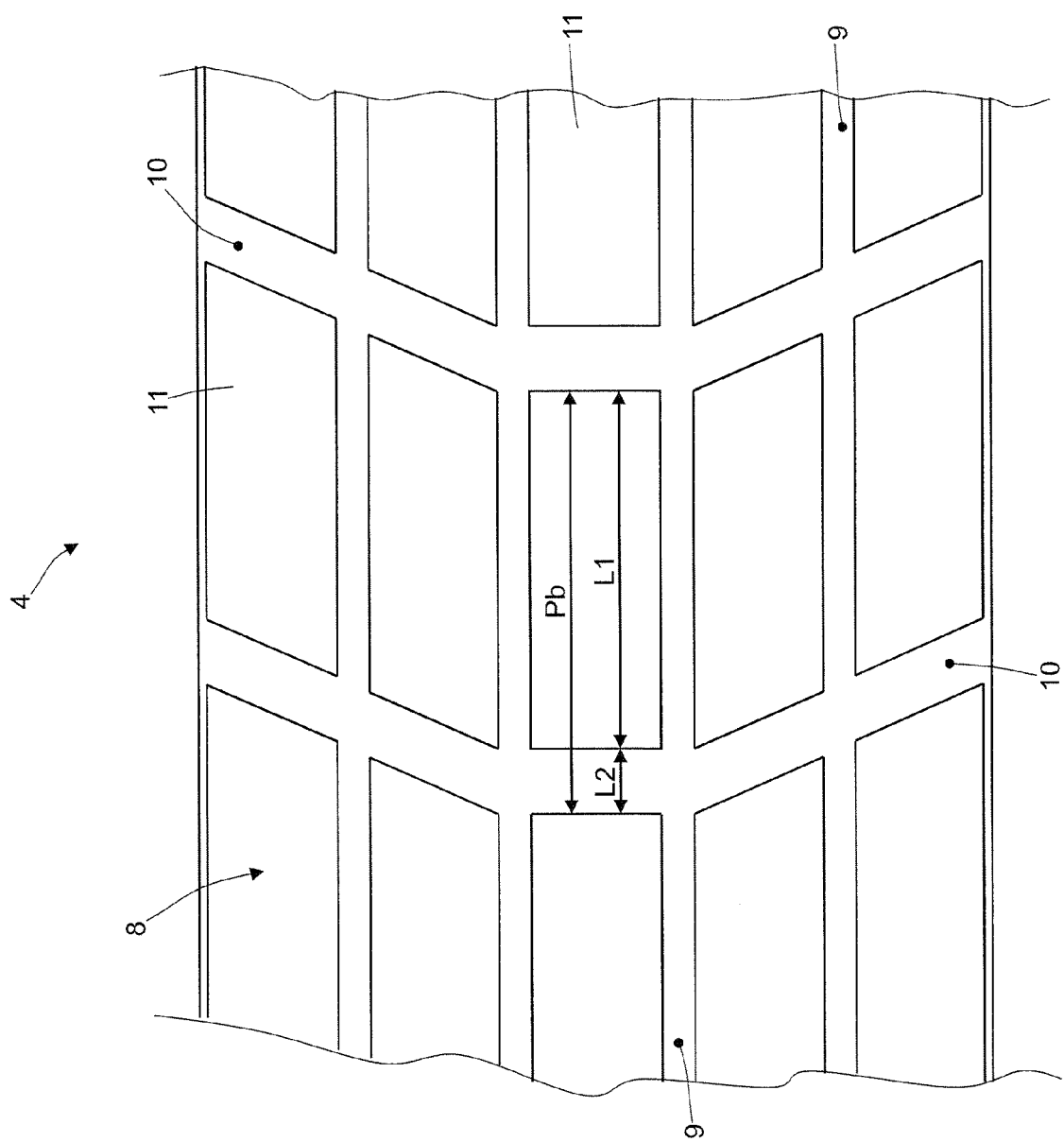

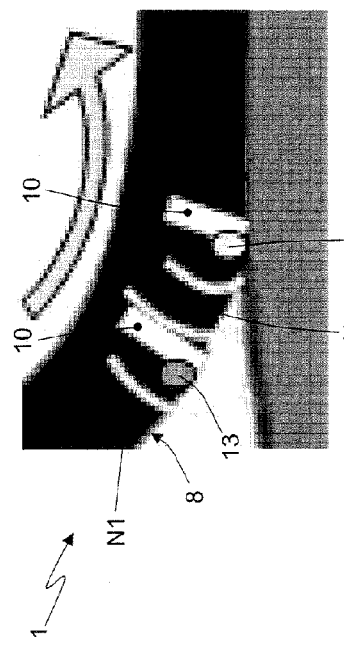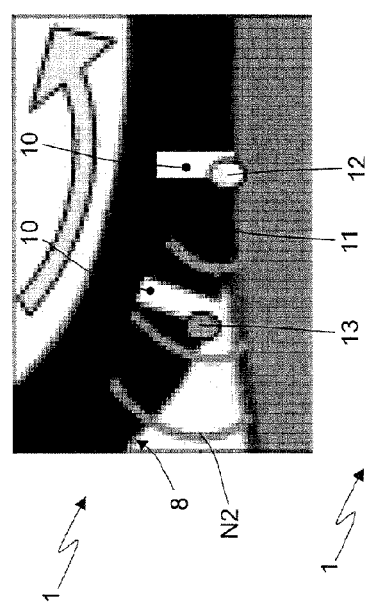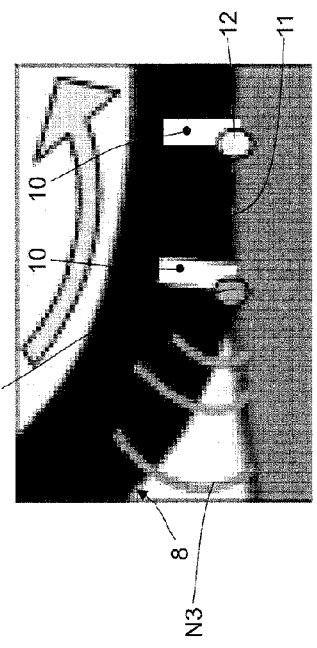

METHOD OF DETERMINING THE LONGITUDINAL PITCH OF TREAD BAND BLOCKS

CROSS REFERENCE TO RELATED APPLICATIONS

This is a National Stage of International Application No. PCT/IB2012/052717, filed May 30, 2012, claiming priority from Italian Patent Application No. TO2011A000471, filed May 30, 2011, the contents of all of which are incorporated herein by reference in their entirety.

TECHNICAL FIELD

The present invention relates to a method of determining the longitudinal pitch of tread band blocks.

BACKGROUND ART

Reducing tyre rolling noise is now an important design issue to conform with stricter future tyre approval standards, which are expected to demand a reduction in maximum rolling noise emissions.

The present invention in particular is aimed at reducing pass-by noise produced by the tread band blocks cyclically impacting the pavement.

Patent Application US2004093106A1 describes a tread band with a raised pattern comprising a number of longitudinal and transverse grooves defining a number of blocks with a given longitudinal pitch, which varies along the tread band as a whole to achieve a given rolling noise emission.

Patent Application US2003040886A1 describes a method of analyzing the tire pitch sequence based on the lug stiffness variations.

Patent Applications WO2010032736A1 and WO2010032737A1 describes a method of designing a tire comprising: determining a resonance frequency based on the ground contact length, determining the number of pitches of a block row, and determining the phase of the block row.

DESCRIPTION OF THE INVENTION

It is an object of the present invention to provide a method of determining the longitudinal pitch of tread band blocks, designed to reduce pass-by noise and which at the same time is cheap and easy to implement.

According to the present invention, there is provided a method of determining the longitudinal pitch of tread band blocks, as claimed in the accompanying Claims.

BRIEF DESCRIPTION OF THE DRAWINGS

A non-limiting embodiment of the present invention will be described by way of example with reference to the accompanying drawings, in which:

FIG. 2 shows a schematic of part of the FIG. 1 tyre tread band;

FIGS. 3a-3c show schematics of the pavement impact sequence of one tyre tread band block;

PREFERRED EMBODIMENTS OF THE INVENTION

Figure 1:
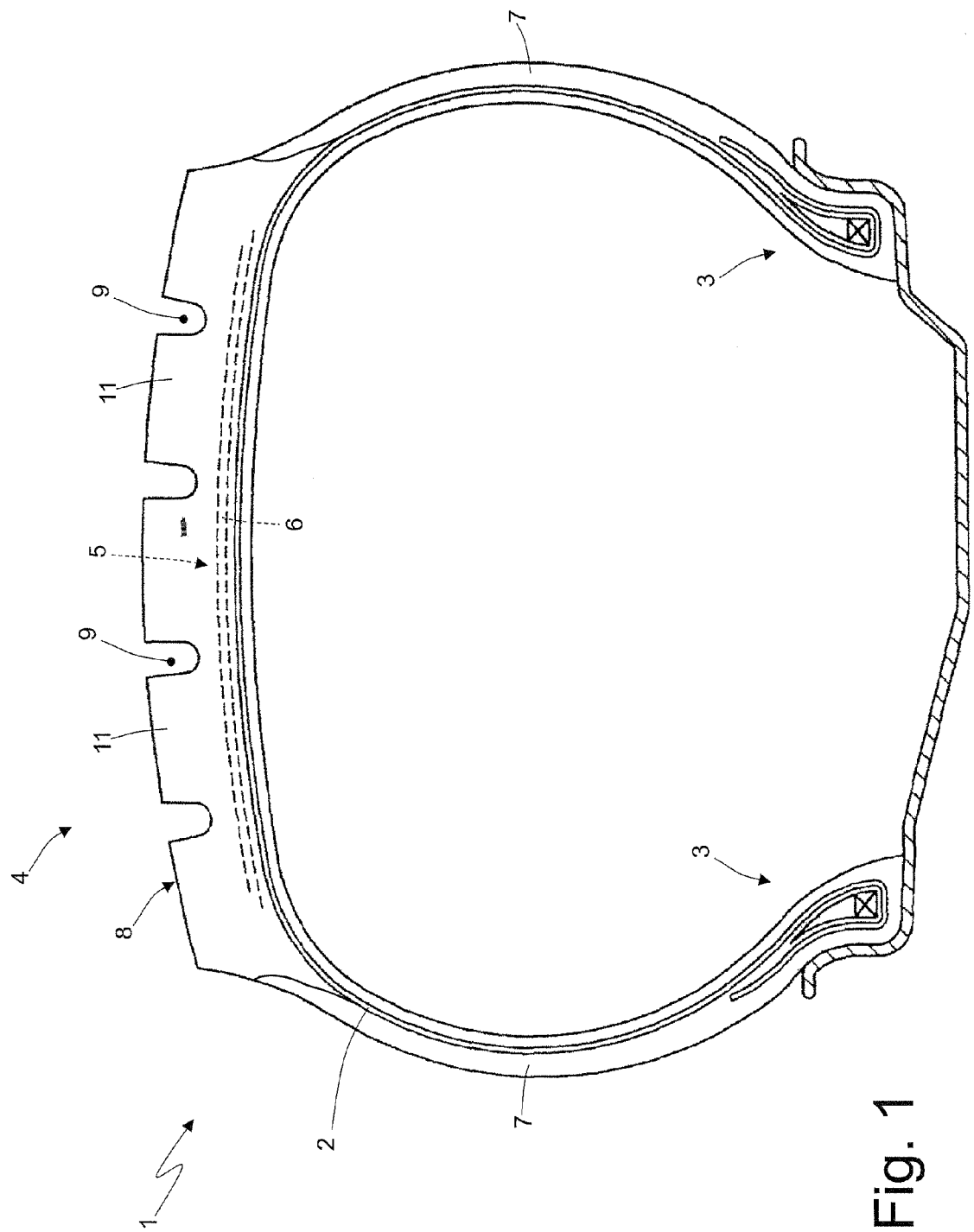
FIG. 1 shows a schematic cross section of part of a tyre.

Number 1 in FIG. 1 indicates as a whole a tyre comprising a toroidal body ply 2 having two annular beads 3 and supporting a tread band 4 made of cured-rubber-based material and defining the crown of tyre 1. A tread belt 5, comprising two tread plies 6, is interposed between body ply 2 and tread belt 4. Each tread ply 6 is defined by a rubber strip, in which side by side cords (not shown) with a given pitch are embedded and inclined at a given angle to the equatorial plane of tyre 1. Body ply 2 also supports two sidewalls 7 between tread band 4 and beads 3; and tread band 4 has a rolling surface 8, which defines tread band 4 externally (i.e. is located radially outwards) and, in use, rests on the pavement.

As shown in FIG. 2, rolling surface 8 of tread band 4 has a raised pattern comprising a number of longitudinal (or circumferential) grooves 9 (i.e. extending crosswise to the rotation axis and along the circumference of tyre 1), and a number of transverse grooves 10 (i.e. parallel to the rotation axis of tyre 1 and perpendicular to longitudinal grooves 9). Longitudinal grooves 9 and transverse grooves 10 form five longitudinal rows of blocks 11, which project radially from tread band 4, are each in the form of a parallelepiped with a rectangular or trapezoidal cross section, and are each bounded laterally by grooves 9 and 10. Blocks 11 in each row are arranged with a longitudinal pitch P, which equals the longitudinal dimension L1 of a block 11 plus the longitudinal dimension L2 of a transverse groove 10.

For the sake of simplicity, the FIG. 3a-3c sequence shows one block 11 of tread band 4 of tyre 1, bounded at the front and rear in the rolling direction by two transverse grooves 10, and bounded laterally by two longitudinal grooves 9. As block 11 impacts the pavement, three different noise sources contributing to generate pass-by noise (i.e. the noise produced by blocks 11 of tread band 4 cyclically impacting the pavement) are observable:

1. fluctuations in pressure produced by the leading edge 12 of block 11 impacting the pavement, and which produce noise N1;

2. fluctuations in pressure produced by resonance of the air inside longitudinal grooves 9 defining block 11, and which produce noise N2;

3. fluctuations in pressure produced by the trailing edge 13 of block 11 impacting the pavement, and which produce noise N3.

Figure 4:
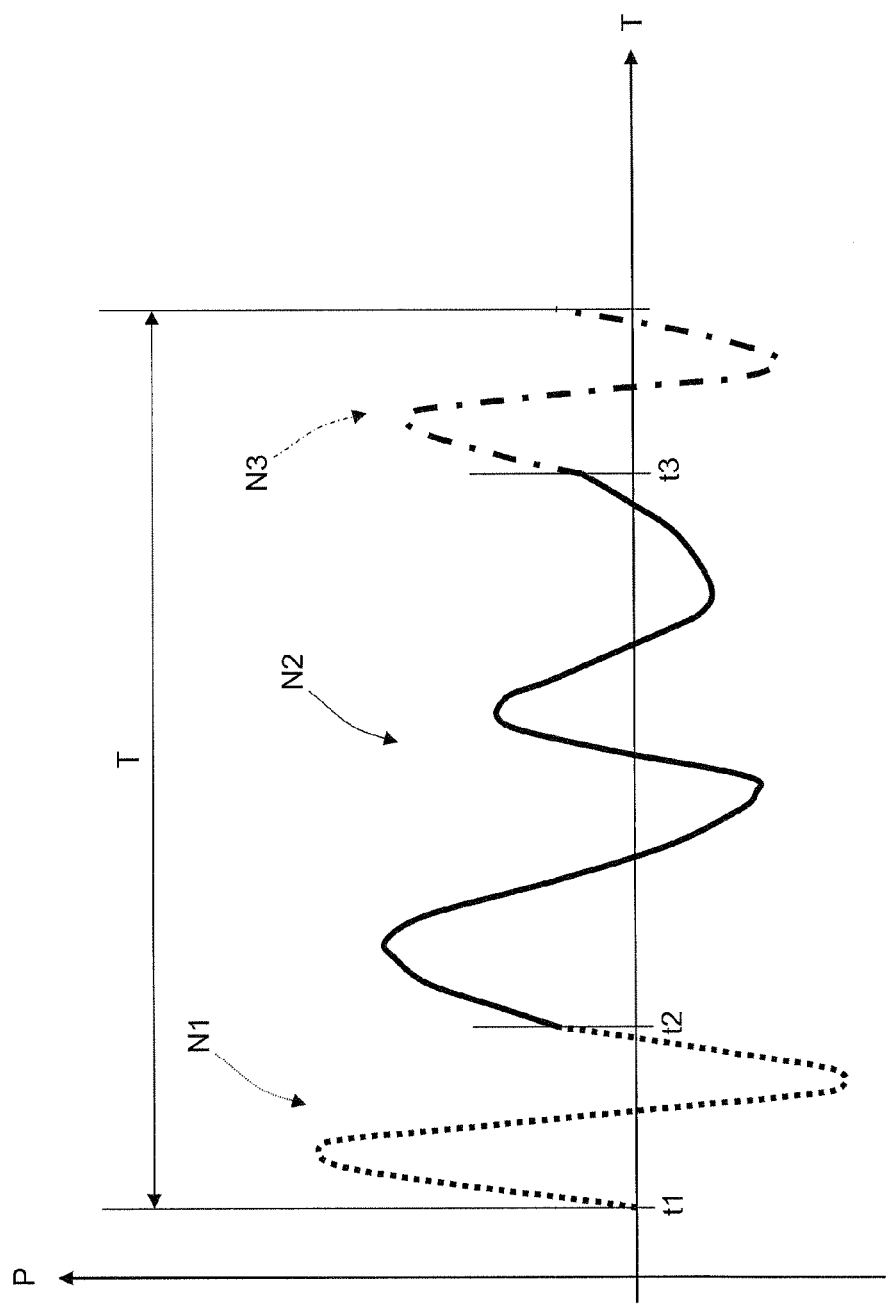
FIG. 4 shows a time graph of the pass-by noise produced by one tyre tread band block impacting the pavement.

It is important to note that noises N1, N2 and N3 are offset in time, i.e. start at different times: as shown in FIG. 4, noise N1 starts at instant t1, at which the leading edge 12 of block 11 impacts the pavement; noise N2 starts at instant t2, which lags behind instant t1 by the time it takes for the stress generated by leading edge 12 of block 11 impacting the pavement to be transmitted to the air inside longitudinal grooves 9 defining block 11; and noise N3 starts at instant t3, at which the trailing edge 13 of block 11 impacts the pavement.

Tests show that noises N2 and N3 may overlap in time (i.e. noise N3 may start while noise N2 is still significantly present). This overlap may result in constructive interference, i.e. the intensity of one of noises N2, N3 is added to that of the other, or in destructive interference, i.e. the intensity of one of noises N2, N3 is subtracted from that of the other. The total transit time T of block 11 is calculated using the following equation [1]:

$$T = P/V \qquad [1]$$

T total transit time of block 11;
P longitudinal pitch of block 11;
V linear speed of tyre 1.

The longitudinal pitch P of block 11 being constant, adjusting the linear speed V of tyre 1 obviously alters the total transit time T of block 11 and therefore the timing of noises N2 and N3. In other words, at certain linear speeds V of tyre 1, the interference between noises N2 and N3 is totally constructive, so pass-by noise (equal to the sum of noises N1, N2 and N3) is maximum (i.e. has local maximums), whereas, at other linear speeds V of tyre 1, the interference between noises N2 and N3 is totally destructive, so pass-by noise (equal to the sum of noises N1, N2 and N3) is minimum (i.e. has local minimums).

Equation [2] below has been determined experimentally to determine when (i.e. at which speeds V of tyre 1) the local pass-by noise minimums occur (i.e. when the interference between noises N2 and N3 is totally destructive):

$$\frac{fp}{fs} = \left(\frac{2k+1}{2}\right) \quad [2]$$

$$fs = \frac{1}{T} = \frac{V}{P} \quad [3]$$

fp resonance frequency of longitudinal grooves 9;
fs sequence frequency;
k integer greater than zero (i.e. 1, 2, 3, 4 . . . );
T total transit time of block 11;
P longitudinal pitch of block 11;
V linear speed of tyre 1.

More specifically, local pass-by noise minimums occur when the above equation [2] applies, i.e. when the ratio between the resonance frequency fp of longitudinal grooves 9 and sequence frequency fs equals 1.5, 2.5, 3.5 . . . . Inserting the above equation [3], defining sequence frequency fs, into equation [2] gives equation [4] below, which applies when local pass-by noise minimums occur:

$$P = \frac{V}{fp} \cdot \left(\frac{2k+1}{2}\right) \quad [4]$$

P longitudinal pitch of block 11;
V linear speed of tyre 1;
fp resonance frequency of longitudinal grooves 9;
k integer greater than zero (i.e. 1, 2, 3, 4 . . . ).

Resonance frequency fp of longitudinal grooves 9 is normally calculated using test-determined equations, such as equation [5] below:

$$fp = \frac{c}{2 \cdot (F + 0.8 \cdot d)} \quad [5]$$

fp resonance frequency of longitudinal grooves 9;
c speed of sound in air;
F tyre 1 footprint length;
d equivalent cross section diameter of longitudinal groove 9 (i.e. the diameter of a circle with the same cross section area as longitudinal groove 9).

For example, resonance frequency fp of longitudinal grooves 9 is roughly 800-1000 Hz in an average-size car tyre 1, and roughly 500-700 Hz in an average-size TBR tyre 1.

Equation [5] above is obviously only one example of a test-determined equation by which to calculate resonance frequency fp of longitudinal grooves 9. Others are proposed in literature, and may be substituted for equation [5], such as the following equation [6]:

$$fp = \frac{c}{2 \cdot F \cdot (1 + \alpha)} \quad [6]$$

fp resonance frequency of longitudinal grooves 9;
c speed of sound in air;
F tyre 1 footprint length;
α test-determined dimensionless constant.

The above equation [4] may therefore be used to determine the best longitudinal pitch Pb of blocks 11 of tyre 1 to minimize pass-by noise at (i.e. when tyre 1 travels at) a target linear speed Vd.

Tests show that, to minimize pass-by noise at a target linear speed Vd, the best longitudinal pitch Pb of blocks 11 of a car tyre 1 is best calculated using equation [4] with a minimum constant k value (i.e. of one). For example, a typical average-size car tyre 1 has a longitudinal pitch P of blocks 11 of 18-25 mm, whereas, for the same tyre, the best longitudinal pitch Pb of blocks 11 to minimize pass-by noise at a target speed Vd of 80 km/h is 28-45 mm, i.e. much longer than the longitudinal pitch P of blocks 11 of a standard tyre 1.

Once the best longitudinal pitch Pb of blocks 11 of tyre 1 is determined using equation [4], tyre 1 can be constructed in two ways : with a constant longitudinal pitch blocks 11 all have the same longitudinal pitch P equal to best longitudinal pitch Pb), or with a variable longitudinal pitch (i.e. blocks 11 have different longitudinal pitches P concentrated about best longitudinal pitch Pb).

A constant longitudinal pitch (i.e. the same longitudinal pitch P, equal to best longitudinal pitch Pb, for all of blocks 11) has the advantage of very low (minimum possible) pass-by noise at target speed Vd, but the drawback of pass-by noise increasing significantly at other than target speed Vd. A constant longitudinal pitch of blocks 11 is normally used on TBR (Truck Bus Radial) tyres used on vehicles typically operated for long periods at the same cruising speed (i.e. long-haul trucks and buses used on motorways, and which therefore practically always travel at the maximum speed limit). In this case, tyre 1 may be built to minimize pass-by noise at a target speed Vd equal to the maximum motorway speed limit of the vehicle for which it is designed. (Admittedly, tyre 1 is proportionally noisier at lower speeds, but the overall noise level at low speed is low anyway).

A variable longitudinal pitch of blocks 11 (i.e. different longitudinal pitches P concentrated about best longitudinal pitch Pb) obviously has the drawback of failing to reduce pass-by noise as much as possible at target speed Vd, but on the other hand has the advantage of also reducing pass-by noise at other than target speed Vd. In other words, compared with the same tyre 1 with a constant longitudinal pitch, a variable longitudinal pitch tyre sacrifices part of the reduction in pass-by noise at target speed Vd in favour of reducing pass-by noise at other than target speed Vd. A variable longitudinal pitch of blocks 11 is normally used on passenger car tyres, i.e. given the wide speed range (at least up to 130 km/h) and, above all, the widely varying speeds at which passenger cars are normally operated, it is extremely difficult to select one specific target speed Vd to favour over others (unlike long-haul trucks and tourist buses operated on motorways).

Variable longitudinal pitch blocks 11 have different longitudinal pitches P concentrated about best longitudinal pitch Pb, i.e. within longitudinal pitches P as a whole, best longitudinal pitch Pb predominates. For example, longitudinal pitches P as a whole may form a Gaussian curve centred about best longitudinal pitch Pb or, in the event of a very long best longitudinal pitch Pb, an asymmetric Gaussian curve unbalanced strongly on the side of longitudinal pitches P smaller than best longitudinal pitch Pb (which represents the predominant value).

One particular asymmetric Gaussian curve is in the form of a half Gaussian curve with an upper (maximum) limit at best longitudinal pitch Pb (i.e. best longitudinal pitch Pb constitutes the predominant and maximum value within longitudinal pitches P as a whole). In other words, a very long longitudinal pitch P of blocks 11 may pose other than noise-related problems (such as water purging problems), so the longitudinal pitch P of blocks 11 is preferably kept within best longitudinal pitch Pb. In a preferred variable-pitch embodiment, best longitudinal pitch Pb constitutes at least 40-60% of the longitudinal pitches P of tyre 1 (i.e. 40-60% of the longitudinal pitches P equal best longitudinal pitch Pb, and 60-40% are other than best longitudinal pitch Pb).

In a preferred variable-pitch embodiment, a minimum longitudinal pitch $P_{min}$ and maximum longitudinal pitch $P_{max}$ defining a longitudinal pitch P range may be determined as a function of a minimum speed $V_{min}$ and maximum speed $V_{max}$ defining a speed range in which to reduce pass-by noise and obviously containing target speed Vd.

In a first embodiment employing equations identical to equation [4], minimum longitudinal pitch $P_{min}$ and maximum longitudinal pitch $P_{max}$ are determined using the following equations [7] and [8]:

$$Pb = \frac{Vd}{fp} \cdot \left(\frac{2k+1}{2}\right) \quad [4]$$

$$P_{min} = \frac{V_{min}}{fp} \cdot \left(\frac{2k+1}{2}\right) \quad [7]$$

$$P_{max} = \frac{V_{max}}{fp} \cdot \left(\frac{2k+1}{2}\right) \quad [8]$$

Pb best pitch of blocks 11;
Vd target speed of tyre 1;
fp resonance frequency of longitudinal grooves 9;
k integer greater than zero (i.e. 1, 2, 3, 4 . . . )
  the chosen constant k value must obviously be coherent, i.e. the same for all three equations [4], [7], [8];
$P_{min}$ minimum longitudinal pitch of blocks 11;
$V_{min}$ minimum speed of tyre 1;
$P_{max}$ maximum longitudinal pitch of blocks 11;
$V_{max}$ maximum speed of tyre 1.

In an alternative embodiment employing equations other than (but obviously derived from) equation [4], minimum longitudinal pitch $P_{min}$ and maximum longitudinal pitch $P_{max}$ are determined using the following equations [9] and [10]:

$$Pb = \frac{Vd}{fp} \cdot \left(\frac{2k+1}{2}\right) \quad [4]$$

$$P_{min} = \frac{V_{max}}{fp} \cdot k \quad [9]$$

$$P_{max} = \frac{V_{min}}{fp} \cdot (k+1) \quad [10]$$

Pb best pitch of blocks 11;
Vd target speed of tyre 1;
fp resonance frequency of longitudinal grooves 9;
k integer greater than zero (i.e. 1, 2, 3, 4 . . . )
  the chosen constant k value must obviously be coherent, i.e. the same for all three equations [4], [9], [10];
$P_{min}$ minimum longitudinal pitch of blocks 11;
$V_{max}$ maximum speed of tyre 1;
$P_{max}$ maximum longitudinal pitch of blocks 11;
$V_{min}$ minimum speed of tyre 1.

For example, with a target speed Vd of 80 km/h, maximum speed $V_{max}$ may be 90 km/h, and minimum speed $V_{min}$ 70 km/h. The speed range between minimum speed $V_{min}$ and maximum speed $V_{max}$ must obviously not be so wide that the longitudinal pitch P range is wide enough to also include significant positive interference between noises N2 and N3.

Determining minimum longitudinal pitch $P_{min}$ and maximum longitudinal pitch $P_{max}$ using equations [7] and [8] ensures the absence of positive interference between noises N2 and N3 (obviously, providing the speed range between minimum speed $V_{min}$ and maximum speed $V_{max}$ is not too wide), and the pitch range between minimum longitudinal pitch $P_{min}$ and maximum longitudinal pitch $P_{max}$ is therefore narrower. Conversely, when determining minimum longitudinal pitch $P_{min}$ and maximum longitudinal pitch $P_{max}$ using equations [9] and [10], a limited amount of positive interference between noises N2 and N3 is allowed (obviously, providing the speed range between minimum speed $V_{min}$ and maximum speed $V_{max}$ is not too wide), and the pitch range between minimum longitudinal pitch $P_{min}$ and maximum longitudinal pitch $P_{max}$ is therefore wider.

For example, in the case of an average-size car tyre 1 with a 900 Hz resonance frequency fp of longitudinal grooves 9, and a target speed Vd of 80 km/h, the best longitudinal pitch Pb is 37 mm (using a constant k of one, i.e. minimum value). In the case of a maximum speed $V_{max}$ of 90 km/h and minimum speed $V_{min}$ of 70 km/h, minimum longitudinal pitch $P_{min}$ and maximum longitudinal pitch $P_{max}$ are respectively 32 mm and 42 mm using equations [7] and [8], and respectively 27 mm and mm using equations [9] and [10]. As stated, an excessively long longitudinal pitch P of blocks 11 can be avoided using more longitudinal pitches P shorter than best longitudinal pitch Pb than longitudinal pitches P longer than best longitudinal pitch Pb.

For example, in the case of an average-size TBR tyre 1 with a 600 Hz resonance frequency fp of longitudinal grooves 9, and a target speed Vd of 70 km/h, the best longitudinal pitch Pb is 48 mm (using a constant k of one, i.e. minimum value) or 81 mm (using a constant k of two). In the case of a maximum speed $V_{max}$ of 80 km/h and minimum speed $V_{min}$ of 60 km/h, minimum longitudinal pitch $P_{min}$ and maximum longitudinal pitch $P_{max}$ are respectively 41 mm and 55 mm using equations [7] and [8] (and a constant k of one, i.e. minimum value), and respectively 37 mm and 55 mm using equations [9] and [10] (and a constant k of one, i.e. minimum value).

Figure 5:
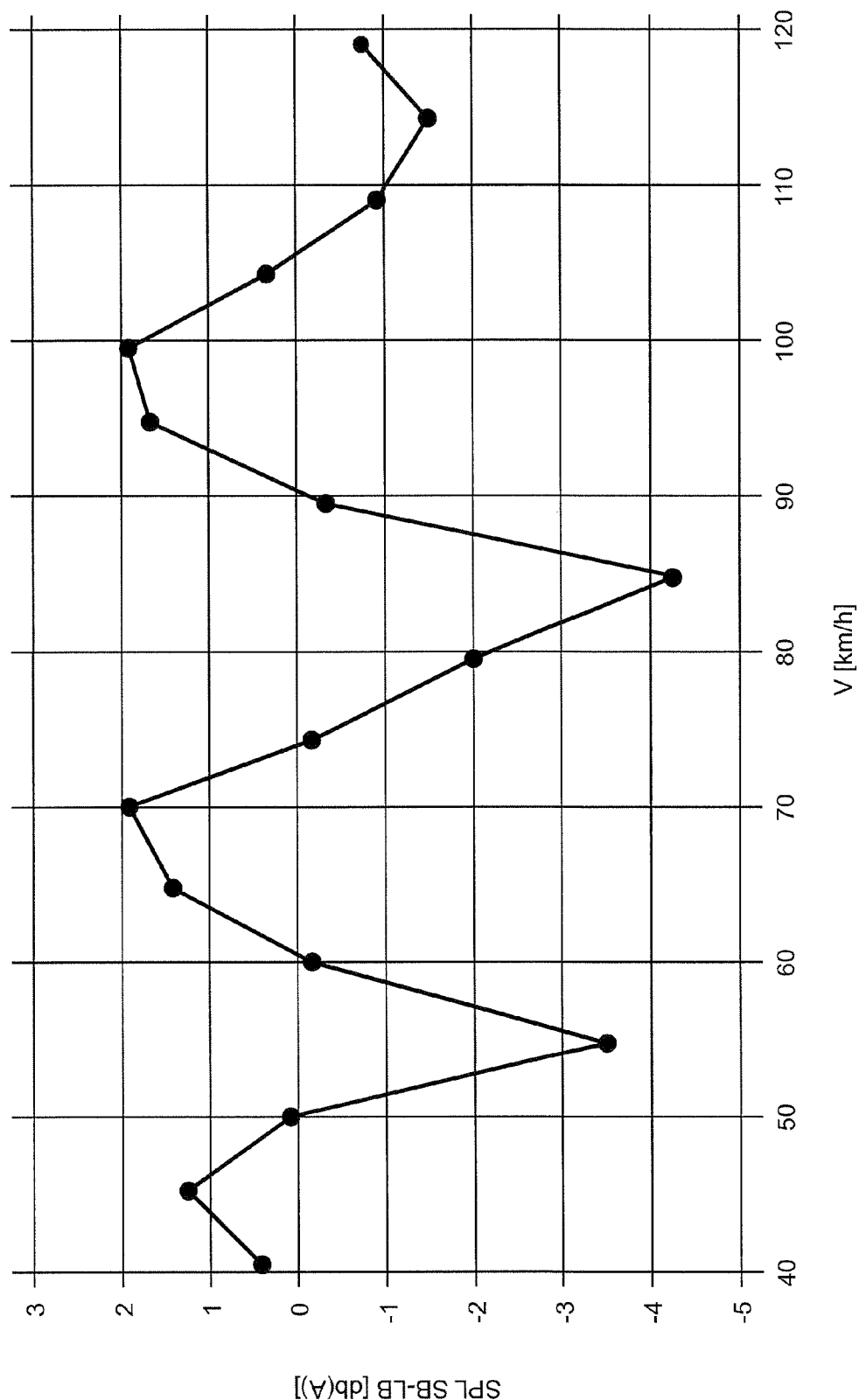
FIG. 5 shows a noise-speed graph illustrating the difference in noise produced by two tyres of the same type but with different longitudinal block pitches.

FIG. 5 shows a noise-speed graph of two tyres of the same type but with different longitudinal pitches P of blocks 11, i.e. shows the noise-speed performance of a tyre with a longitudinal pitch P of blocks 11 determined as described above to minimize pass-by noise at a target speed Vd of 85 km/h, and a similar tyre with a standard longitudinal pitch P of blocks 11. As can be seen, at the 85 km/h target speed Vd, there is a significant reduction in noise with respect to the standard tyre (the noise difference has a local maximum). At speeds V of 70 and 100 km/h, there is an increase in noise with respect to the standard tyre (the noise difference has a local minimum) due to totally constructive interference between noises N2 and N3 at those speeds V. And the noise difference has other local maximums at speeds V of 55 and 115 km/h, and another local minimum at a speed V of 45 km/h. It is important to note that, in the speed range considered (40-120 km/h), the noise difference is much more negative than positive, i.e. on the whole, noise is reduced significantly more than it is increased (e.g. the absolute maximum noise reduction ranges between 4 and 5 db(A), as compared with an absolute minimum noise reduction of less than 2 db(A).

The method described of determining the longitudinal pitch P of blocks 11 of tread band 4 has numerous advantages. It provides for sizing the longitudinal pitch P of blocks 11 to achieve a significant reduction in pass-by noise at (or, rather, about) a given target speed Vd, and, what is more, with no negative side effects whatsoever (provided the lowest longitudinal pitch P values of blocks 11 supplied by the method are use, if necessary).

The invention claimed is:

1. A method of manufacturing a tyre comprising the steps of:
designing a tread band of the tyre, the tyre tread band comprising blocks defining a raised pattern comprising a number of longitudinal grooves and transverse grooves;
determining a best longitudinal pitch of blocks of a tread band of the tyre, to minimize pass-by noise at a given target speed, according to the equation:

$$Pb = \frac{Vd}{fp} \cdot \left(\frac{2k+1}{2}\right) \quad [4]$$

Pb best longitudinal pitch of the blocks,
Vd target speed of the tyre,
fp resonance frequency of the longitudinal grooves,
K integer greater than zero;
arranging the blocks in the tread band in a longitudinal row along the tyre tread band based on the determined best longitudinal pitch Pb; and
manufacturing the tyre with the blocks after the step of arranging.

2. The method as claimed in claim 1, wherein the resonance frequency of the longitudinal grooves is calculated according to the equation:

$$fp = \frac{c}{2 \cdot (F + 0.8 \cdot d)} \quad [5]$$

fp resonance frequency of the longitudinal grooves;
c speed of sound in air;
F footprint length of the tyre;
d equivalent cross section diameter of the longitudinal grooves.

3. The method as claimed in claim 1, wherein the resonance frequency of the longitudinal grooves is calculated according to the equation:

$$fp = \frac{c}{2 \cdot F \cdot (1 + \alpha)} \quad [6]$$

fp resonance frequency of the longitudinal grooves;
c speed of sound in air;
F footprint length of the tyre;
α test-determined dimensionless constant.

4. The method as claimed in claim 1, wherein longitudinal pitch of the blocks is constant, and equals the best longitudinal pitch along the whole of the tread band.

5. The method as claimed in claim 1, wherein longitudinal pitch of the blocks varies along the whole of the tread band, so the blocks have different longitudinal pitches concentrated about the best longitudinal pitch.

6. The method as claimed in claim 5, wherein, within the longitudinal pitches (P) as a whole, the best longitudinal pitch is predominant.

7. The method as in claim 5 wherein the best longitudinal pitch accounts for at least 40% of the longitudinal pitches of the tyre.

8. The method as claimed in claim 5, wherein the longitudinal pitches as a whole form a Gaussian curve centred about the best longitudinal pitch, or an asymmetric Gaussian curve containing the best longitudinal pitch.

9. The method as claimed in claim 5, and comprising the further step of determining a minimum longitudinal pitch and maximum longitudinal pitch defining a longitudinal pitch (P) range, as a function of a minimum speed and maximum speed defining a speed range containing the target speed.

10. The method as claimed in claim 9, and comprising the further step of calculating the minimum longitudinal pitch and maximum longitudinal pitch according to the equations:

$$P_{min} = \frac{V_{min}}{fp} \cdot \left(\frac{2k+1}{2}\right) \quad [7]$$

$$P_{max} = \frac{V_{max}}{fp} \cdot \left(\frac{2k+1}{2}\right) \quad [8]$$

$P_{min}$ minimum longitudinal pitch of the blocks (11);
$V_{min}$ minimum speed of the tyre (1);
fp resonance frequency of the longitudinal grooves (9);
k greater-than-zero integer which must be coherent for all three equations [4], [7] and [8];
$P_{max}$ maximum longitudinal pitch of the blocks;
$V_{max}$ maximum speed of the tyre.

11. The method as claimed in claim 9, and comprising the further step of calculating the minimum longitudinal pitch and maximum longitudinal pitch according to the equations:

$$P_{min} = \frac{V_{max}}{fp} \cdot k \quad [9]$$

$$P_{max} = \frac{V_{min}}{fp} \cdot (k+1) \quad [10]$$

$P_{min}$ minimum longitudinal pitch of the blocks;
$V_{max}$ maximum speed of the tyre;

fp resonance frequency of the longitudinal grooves;
k greater-than-zero integer which must be coherent for all three equations [4], [9] and [10];
$P_{max}$ maximum longitudinal pitch of the blocks;
$V_{min}$ minimum speed of the tyre.

12. A method of manufacturing a tyre, comprising providing toroidal body ply having two annular beads and supporting a tread band made of cured rubber based material and defining the crown of tyre, wherein the tread band comprising blocks spaced according to the best longitudinal pitch of claim 1.

13. The method as claimed in 5 wherein the best longitudinal pitch accounts for at least 60% of the longitudinal pitches of the tyre.

14. A method of manufacturing a tyre comprising a tyre tread band, the tyre tread band comprising blocks spaced based on a best longitudinal pitch and defining a raised pattern comprising a number of longitudinal grooves and transverse grooves; the method comprising the steps of: calculating the best longitudinal pitch of the blocks, to minimize pass-by noise at a given target speed, according to the equation:

$$Pb = \frac{Vd}{fp} \cdot \left(\frac{2k+1}{2}\right) \quad \{4\}$$

Pb best longitudinal pitch of the blocks,
Vd target speed of the tyre,
fp resonance frequency of the longitudinal grooves,
k integer greater than zero;
determining a minimum longitudinal pitch and maximum longitudinal pitch defining a longitudinal pitch range, as a function of a minimum speed and maximum speed defining a speed range containing the target speed; and
manufacturing the tyre by varying the longitudinal pitch of the blocks in the same block row along the whole of the tread band, so in the same block row the blocks have different longitudinal pitches concentrated about the best longitudinal pitch and contained within the longitudinal pitch range.

15. The method as claimed in claim 14, wherein, within the longitudinal pitches as a whole, the best longitudinal pitch is predominant.

16. The method as claimed in claim 14 wherein the best longitudinal pitch accounts for at least 40% of the longitudinal pitches of the tyre.

17. The method as claimed in claim 14, wherein the longitudinal pitches as a whole form a Gaussian curve centred about the best longitudinal pitch, or an asymmetric Gaussian curve containing the best longitudinal pitch.

18. The method as claimed in claim 14, and comprising the further step of calculating the minimum longitudinal pitch and maximum longitudinal pitch according to the equations:

$$P_{min} = \frac{V_{min}}{fp} \cdot \left(\frac{2k+1}{2}\right) \quad [7]$$

$$P_{max} = \frac{V_{max}}{fp} \cdot \left(\frac{2k+1}{2}\right) \quad [8]$$

$P_{min}$ minimum longitudinal pitch of the blocks;
$V_{min}$ minimum speed of the tyre;
fp resonance frequency of the longitudinal grooves;
k greater-than-zero integer which must be coherent for all three equations [4], [7] and [8];
$P_{max}$ maximum longitudinal pitch of the blocks;
$V_{max}$ maximum speed of the tyre.

19. The method as claimed in claim 14, and comprising the further step of calculating the minimum longitudinal pitch and maximum longitudinal pitch according to the equations:

$$P_{min} = \frac{V_{max}}{fp} \cdot k \quad [9]$$

$$P_{max} = \frac{V_{min}}{fp} \cdot (k+1) \quad [10]$$

$P_{min}$ minimum longitudinal pitch of the blocks;
$V_{max}$ maximum speed of the tyre;
fp resonance frequency of the longitudinal grooves;
k greater-than-zero integer which must be coherent for all three equations [4], [9] and [10];
$P_{max}$ maximum longitudinal pitch of the blocks;
$V_{min}$ minimum speed of the tyre.

20. A method of manufacturing a tyre, comprising providing toroidal body ply having two annular beads and supporting a tread band made of cured rubber based material and defining the crown of tyre, wherein the tread band comprising blocks spaced according to the best longitudinal pitch of claim 14.

21. The method as claimed in claim 14 wherein the best longitudinal pitch accounts for at least 60% of the longitudinal pitches of the tyre.

* * * * *